US006602136B1

(12) United States Patent
Baerlocher et al.
(10) Patent No.: US 6,602,136 B1
(45) Date of Patent: Aug. 5, 2003

(54) GAMING DEVICE WITH A BONUS SCHEME INVOLVING MOVEMENT ALONG PATHS WITH PATH CHANGE CONDITIONS

(75) Inventors: Anthony J. Baerlocher, Reno, NV (US); Peter Gerrard, Prestwich (GB); Dov L. Randall, Whitefield (GB)

(73) Assignee: IGT, Reno, NV (US)

(*) Notice: Subject to any disclaimer, the term of this patent is extended or adjusted under 35 U.S.C. 154(b) by 329 days.

(21) Appl. No.: 09/686,538

(22) Filed: Oct. 11, 2000

(51) Int. Cl.[7] .............................. A63F 13/00; A63F 1/00

(52) U.S. Cl. ........................................ 463/16; 273/138.1

(58) Field of Search .......................... 463/16–22, 25–28, 463/30–31, 37; 273/138.1, 138.2, 139, 143 R, 269, 236, 283–284, 292–293

(56) References Cited

U.S. PATENT DOCUMENTS

| | | | | |
|---|---|---|---|---|
| 5,501,455 A | | 3/1996 | Hirata et al. | |
| 5,664,998 A | | 9/1997 | Seelig et al. | |
| 5,788,573 A | | 8/1998 | Baerlocher et al. | |
| 5,947,820 A | * | 9/1999 | Morro et al. | 463/9 |
| 5,980,384 A | | 11/1999 | Barrie | |
| 5,996,997 A | * | 12/1999 | Kamille | 273/139 |
| 5,997,400 A | | 12/1999 | Seelig et al. | |
| 5,997,401 A | | 12/1999 | Crawford | |
| 6,019,369 A | | 2/2000 | Nakagawa et al. | |
| 6,059,289 A | | 5/2000 | Vancura | |
| 6,089,977 A | | 7/2000 | Bennett | |
| 6,102,798 A | * | 8/2000 | Bennett | 463/16 |
| 6,142,874 A | | 11/2000 | Kodachi et al. | |
| 6,159,098 A | * | 12/2000 | Slomiany et al. | 463/25 |
| 6,168,520 B1 | | 1/2001 | Baerlocher et al. | |
| 6,168,523 B1 | | 1/2001 | Piechowiak et al. | |
| 6,190,254 B1 | | 2/2001 | Bennett | |
| 6,190,255 B1 | | 2/2001 | Thomas et al. | |
| 6,315,660 B1 | * | 11/2001 | DeMar et al. | 463/16 |
| 2002/0010018 A1 | * | 1/2002 | Lemay et al. | 463/20 |

FOREIGN PATENT DOCUMENTS

| | | |
|---|---|---|
| EP | 0874337 A1 | 10/1998 |
| EP | 0945837 A2 | 9/1999 |
| EP | 0984409 A2 | 3/2000 |
| WO | WO 9732285 | 9/1997 |
| WO | WO 00/12186 | 3/2000 |

OTHER PUBLICATIONS

Fox 'N' Hound Brochure and Website Page published by IGT in 2000, website printed on Mar. 21, 2001.
Elvis Brochure and Article published by IGT in 1999.
Pink Panther Brochure and Article published by IGT in 2000.
Monopoly Brochures and Articles published by WMS Gaming, Inc. in 1998, 1999 and 2000.
Slotopoly Brochure and Article published by IGT in 1998.
Adders and Ladders Brochure published by Barcrest Ltd.
Road Hog Game Brochure (and Description) published by Barcrest Ltd.
Spiker the Biker Brochure published by Barcrest Ltd.
Run for Your Money Game Brochure (and Description) published by Barcrest Ltd. in 1998 and 1999.
Easy Street Brochures and Articles published by Casino Data Systems in 2000.
Addams Family Brochure and Article published by IGT in 2000.
Hyper Viper Advertisement written by Barcrest, published in Apr. 1983.

* cited by examiner

*Primary Examiner*—Kim Nguyen
(74) *Attorney, Agent, or Firm*—Bell, Boyd & Lloyd LLC

(57) ABSTRACT

The present invention relates to a bonus scheme for a gaming device which involves a symbol marker which advances along one or more paths. The paths include a plurality of symbols and one or more path change conditions. If a path change condition occurs, the symbol marker moves from one path to a different path. While advancing along certain paths, the player has the opportunity to gain bonus value depending upon which symbol the symbol marker visits. This type of bonus scheme increases player excitement and joy for gaming devices.

28 Claims, 9 Drawing Sheets

GAMING DEVICE WITH A BONUS SCHEME INVOLVING MOVEMENT ALONG PATHS WITH PATH CHANGE CONDITIONS

This application is related to the following commonly-owned co-pending patent applications: "GAMING DEVICE HAVING A BONUS SCHEME WITH MULTIPLE SELECTION GROUPS," Ser. No. 09/656,702, now U.S. Pat. No. 6,439,995; "GAMING DEVICE WITH AWARD AND DEDUCTION PROXIMITY BASED SOUND EFFECT FEATURE," Ser. No. 09/656,663, now pending; "GAMING DEVICE WITH BONUS SCHEME PROVIDING AWARDS ASSOCIATED WITH MOVEMENTS ALONG PATH," Ser. No. 09/583,429, now pending; "GAMING DEVICE WITH BONUS SCHEME PROVIDING INCREASED REWARD FOR SELECTING RELATED SYMBOLS," Ser. No. 09/605,023, now pending; "GAMING DEVICE HAVING A MULTIPLE SELECTION GROUP BONUS ROUND," Ser. No. 09/605,107, now U.S. Pat. No. 6,511,375; "GAMING DEVICE HAVING A MULTI-ROUND BONUS SCHEME WHEREIN EACH ROUND HAS A PROBABILITY OF SUCCESS," Ser. No. 09/688,441, now pending; "GAMING DEVICE HAVING A DESTINATION PURSUIT BONUS SCHEME WITH ADVANCED AND SETBACK CONDITIONS," Ser. No. 09/686,409, now U.S. Pat. No. 6,494,785; "GAMING DEVICE HAVING A BONUS SCHEME INCLUDING A PLURALITY OF SELECTION GROUPS WITH WIN-GROUP OUTCOMES", Ser. No. 09/981,084, now pending; "APPARATUS AND METHOD FOR MODIFYING GENERATED VALUES TO DETERMINE AN AWARD IN A GAMING DEVICE," Ser. No. 09/957,018, now pending; "GAMING DEVICE HAVING A BONUS SCHEME WITH MULTIPLE SELECTION GROUPS," Ser. No. 10/195,292, now pending; "GAMING DEVICE HAVING A BONUS SCHEME WITH MULTIPLE SELECTION GROUPS," Ser. No. 10/243,047, now pending; "GAMING DEVICE HAVING A DESTINATION PURSUIT BONUS SCHEME WITH ADVANCE AND SETBACK CONDITIONS," Ser. No. 10/288,750, now pending; "GAMING DEVICE HAVING A MULTIPLE SELECTION GROUP BONUS ROUND," Ser. No. 10/327,538, now pending.

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device with a bonus scheme wherein a player receives various awards when a symbol marker is associated with or visits various symbols along a path, and the symbol marker changes paths when the player reaches certain path change conditions.

BACKGROUND OF THE INVENTION

Games which involve a path and the use of number generators are well known. Several traditional games include a path which is cyclical. If a player steadily advances in one direction along the cyclical path, the player eventually reaches the player's starting point. Furthermore, the path includes various symbols which act as locations for a player's marker. Certain symbols are associated with events which increase the player's chances of winning the game or gaining value. Other symbols are associated with events which decrease the player's chances of winning the game or gaining value. Typically, the object of these types of games is to continue along the path while accumulating value and avoiding a loss of points or being eliminated from the game.

Contemporary gaming devices, such as slot machines, traditionally involve various primary games and bonus round games. One known gaming device which includes movement along a path is disclosed in WIPO Patent No. WO0012186, published on Mar. 9, 2000 and assigned on its face to WMS Gaming Inc. To increase player enjoyment and excitement, it is desirable to provide gaming machines with new bonus schemes which incorporate new path concepts.

SUMMARY OF THE INVENTION

The present invention overcomes the above shortcomings by providing a bonus scheme and method which provides players with a plurality of paths, a plurality of symbols on each path, at least one symbol marker and at least one path change condition.

Each path includes a plurality of symbols aligned in a predetermined shape such as a circle, polygon, line or curve. The gaming device preferably displays the different paths to the player at once. For example, the paths can be arranged vertically, horizontally or in any other fashion on the display device of the gaming device. Each path is preferably functionally cyclical, even though the path may be displayed in a linear form.

The gaming device preferably provides the player with one symbol marker, in visual or audio-visual form. During the bonus round, the gaming device causes the symbol marker to land on or visit various symbols. The term visit, as used herein, includes being adjacent to, on or associated with a symbol. When the symbol marker visits a symbol, the symbol marker identifies which symbol it is currently visiting.

When a player reaches a path change condition during the bonus round, the symbol marker moves from one path to a different path. A path change condition is any predetermined symbol, event or series of events which, when reached by a player, causes the symbol marker to change paths. Preferably, a path change condition occurs when a symbol marker visits one or more predetermined symbols.

In one preferred embodiment, a path change condition occurs when a symbol marker visits a particular type of symbol a certain number of times (hereafter, "accumulation symbol"). In another preferred embodiment, a path change condition occurs when a symbol marker visits certain symbols which together constitute a predetermined combination of symbols (hereafter, "combination symbols"). In yet another preferred embodiment, a path change condition occurs when a symbol marker completes a certain number of trips through a particular path.

In addition, the paths include one or more award symbols which are associated with bonus values so that when a symbol marker visits such an award symbol, the gaming device awards the player with the associated bonus value. Preferably, one or more of the paths include symbols which, when visited by a symbol marker, terminate the bonus round (hereafter, "terminating symbols").

In operation, the gaming device causes the symbol marker to visit a symbol. The gaming device may cause this visit automatically, or preferably the gaming device does so by enabling the player to push a play button or other activator. After the player pushes the player button, preferably the gaming device displays a visit indicator to the player. This message indicates the number of symbols the symbol marker will move forward or in any other direction. The gaming device enables the player to push the play button repeatedly until the symbol marker reaches a predetermined termination condition or achieves a predetermined award limit, at which time the bonus round terminates. A termination condition is any event which causes the gaming device to terminate the bonus round, such as the symbol marker visiting a terminating symbol or terminating symbol combination. As long as the player avoids the terminating conditions and the award limit, the game enables the player to gain bonus value. The player also has the opportunity to change paths by reaching path change conditions.

If a path change condition occurs, the symbol marker moves to a different path where, as with the previous path, the player can push the player button to cause the symbol marker to move. Here, the player can gain bonus value, reach another path change condition or reach a terminating condition. The player can change paths as many times as the predetermined design of the gaming device allows. Preferably, each path has different symbols, bonus values, path change conditions and/or accompanying graphics.

Eventually the player will reach a terminating condition or else the player will reach the award limit, at which time the bonus round terminates. When the bonus round terminates, the gaming device will accumulate and award all bonus values which the player gained. Finally, the gaming device will provide the player with any credits gained during the bonus round.

The bonus scheme of the present invention involves a player moving a symbol marker along a path. The player has the opportunity to gain bonus values associated with this path. The player can also change paths and gain bonus values associated with other paths. This type of bonus scheme increases the enjoyment which player experience when playing gaming devices.

It is therefore an object of the present invention to provide a gaming device with a bonus scheme which involves movement along a plurality of paths and path change conditions.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
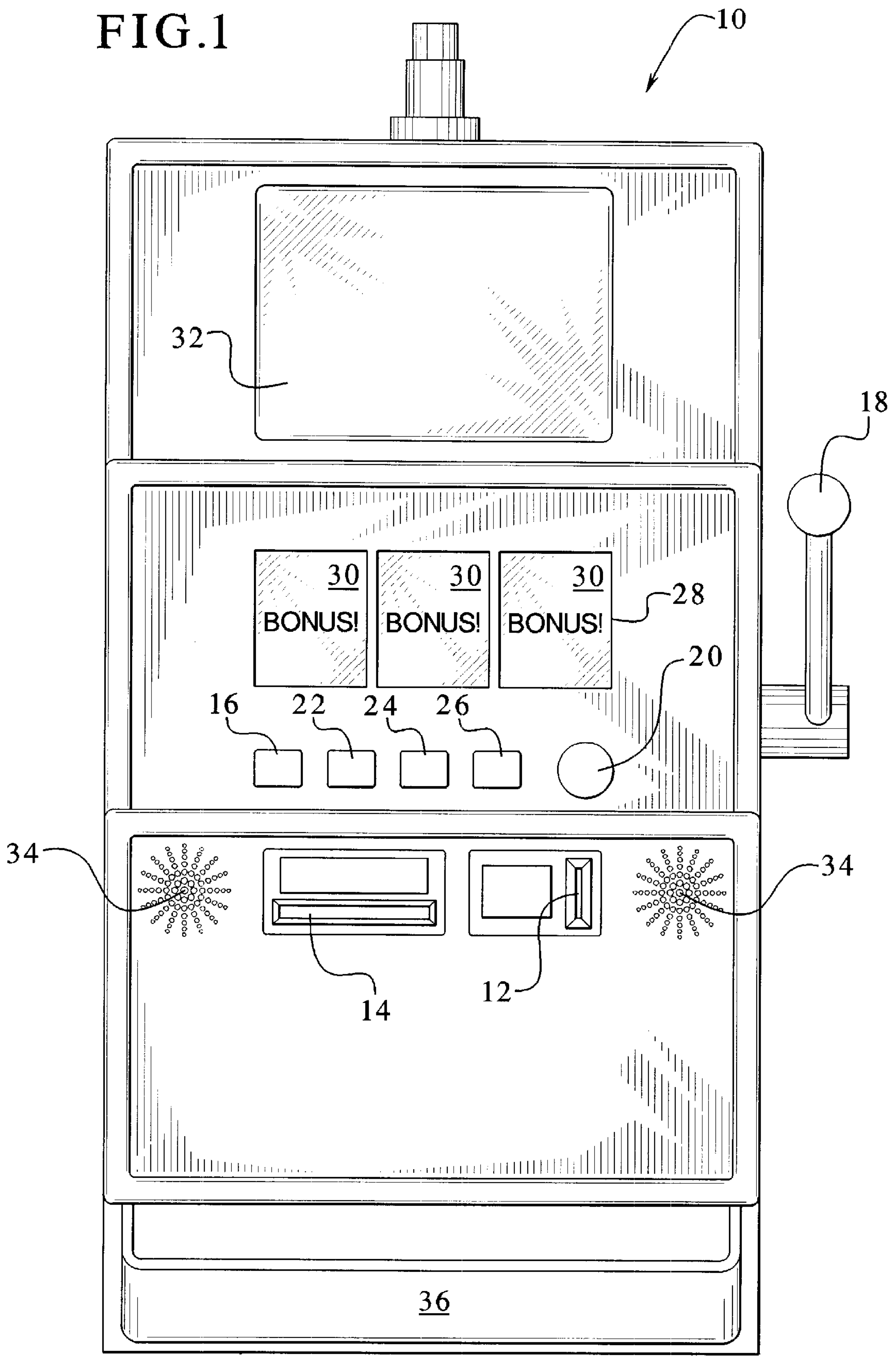
FIG. 1 is a front plan view of one embodiment of the gaming device of the present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. However, it should be appreciated that gaming device 10 can be constructed as a pub-style table-top game (not shown) which a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any game such as slot, poker or keno in addition to any of their bonus triggering events which trigger the bonus scheme of the present invention. The symbols and indicia used on and in gaming device 10 may be in mechanical, electrical or video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any activator used by the player which starts any game or sequence of events in the gaming device.

As shown in FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a display window 28 which contains a plurality of reels 30, preferably three to five reels in mechanical or video form. Each reel 30 displays a plurality of indicia such as bells, hearts, fruits, numbers, letters, bars or other images which preferably correspond to a theme associated with the gaming device 10. If the reels 30 are in video form, the gaming device 10 preferably displays the video reels 30 at video monitor 32 instead of at display window 28. Display window 28 and video monitor 32 can be any display devices capable of displaying images to a player. Furthermore, gaming device 10 preferably includes speakers 34 for making sounds or playing music.

At any time during the game, a player may "cash out" and thereby receive a number of coins corresponding to the number of remaining credits by pushing a cash out button 26. When the player "cashes out," the player receives the coins in a coin payout tray 36. The gaming device 10 may employ other payout mechanisms such as credit slips redeemable by a cashier or electronically recordable cards which keep track of the player's credits.

Figure 2:
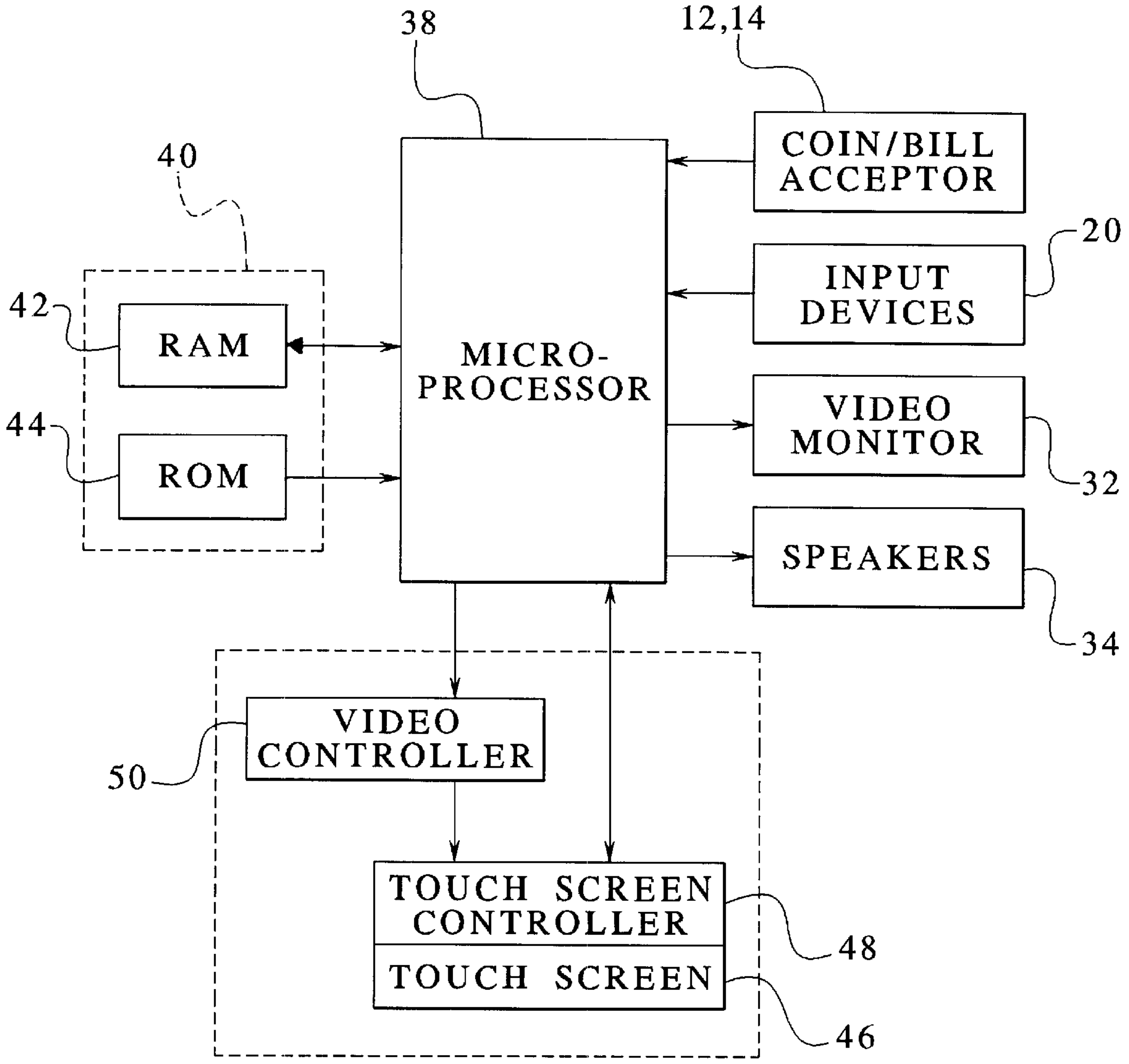
FIG. 2 is a schematic block diagram of the electronic configuration of one embodiment of the gaming device of the present invention.

With respect to electronics, gaming device 10 preferably includes the electronic configuration generally illustrated in FIG. 2, including a processor 38, a memory device 40 for storing program code or other data, a video monitor 32 or other display device (i.e., a liquid crystal display) and at least one input device such as play buttons 20. The processor 38 is preferably a microprocessor or microcontroller-based platform which is capable of displaying images, symbols and other indicia such as images of people, characters, places, things and faces of cards. The memory device 40 can include random access memory (RAM) 42 for storing event data or other data generated or used during a particular game. The memory device 40 can also include read only memory (ROM) 44 for storing program code which controls the gaming device 10 so that it plays a particular game in accordance with applicable game rules and pay tables.

As illustrated in FIG. 2, the player preferably uses play buttons 20 to input signals into gaming device 10. Furthermore, a touch screen 46 and an associated touch screen controller 48 can be used instead of a conventional video monitor 32. Touch screen 46 and touch screen controller 48 can be connected to a video controller 50 and processor 38. A player can make decisions and input signals into the gaming device 10 by touching touch screen 46 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer" or "controller."

With reference to FIGS. 1 and 2, to operate the gaming device 10, the player must insert the appropriate amount of money or tokens at coin slot 12 or bill acceptor 14 and then pull the arm 18 or push the play button 20. The reels 30 will then begin to spin. Eventually, the reels 30 will come to a stop. As long as the player has credits remaining, the player can spin the reels 30 again. Depending upon where the reels 30 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on the display window 28. The gaming device 10 can also enable the player to play the bonus round at video monitor 32 shown in FIG. 1. Preferably, the qualifying condition is a predetermined combination of indicia appearing on a plurality of reels 30. As illustrated in the three reel slot game shown in FIG. 1, the qualifying condition could be the text "BONUS!" appearing in the same location on three adjacent reels.

Bonus Scheme

If a player achieves a bonus triggering or qualifying condition while playing the game, the gaming device 10 automatically begins the bonus round. As indicated by block 52 in FIG. 3, once the bonus round begins, the gaming device displays one or more paths 54. As illustrated in FIG. 4, the gaming device can display several paths 54 at once. Here, the gaming device displays four paths 54 in a vertical line indicated as paths 54*x*, 54*y*, 54*z* and 54*n* and labeled as "Path X," "Path Y," "Path Z" and "Path N," respectively. However, it should be appreciated that the gaming device can display any number of paths 54 at once, and the gaming device can display them in any fashion, such as vertically, horizontally, diagonally, or in any other orderly or in any disorderly fashion. Furthermore, the gaming device can be adapted to display only one path 54 at any one time. In such an embodiment, when a path change occurs (as discussed below), the gaming device replaces one path with a different path in the same position of the prior path.

Figure 5:
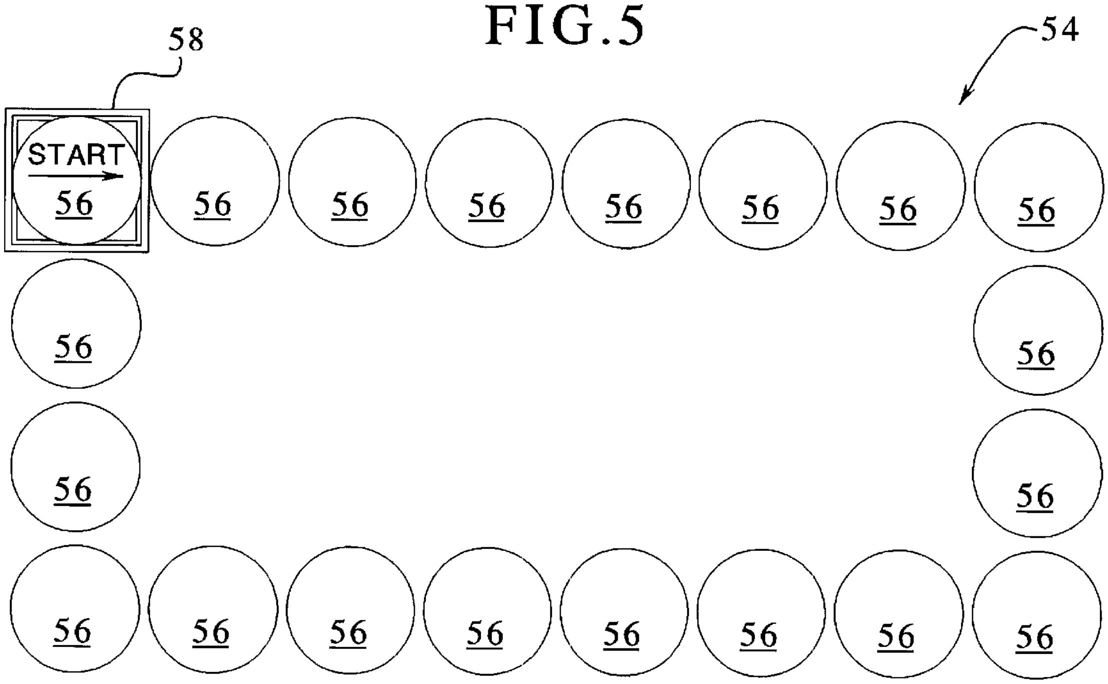
FIG. 5 is a top plan view of a path of the present invention.
Figure 6:
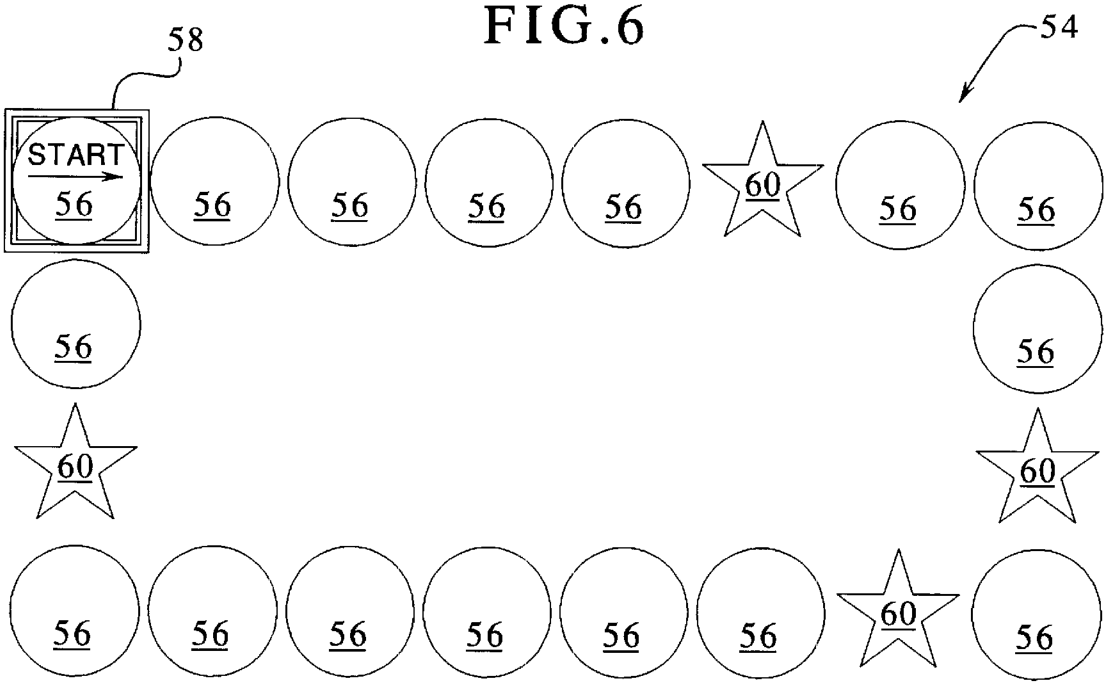
FIG. 6 is a top plan view of a path of the present invention including accumulation symbols.

Each path 54 includes a plurality of symbols 56 as shown in FIGS. 5 through 9. A symbol 56 can be any visual or audio-visual representation of a person, place or thing, including, without limitation, numerals, letters, characters and other images. In FIG. 5, the paths 54 are rectangular in shape. However, paths 54 can be of any shape, including, but not limited to circles, ovals, polygons, curves and lines. The symbols 56 can be spatially arranged in any fashion, though preferably they are positioned so that they adjoin one another. In addition, it is preferable that the paths 54 are functionally cyclical, meaning that they have no end point.

In FIGS. 5 through 9, symbols 56 of no particular type are represented as circles. In all of the paths 54 shown in FIGS. 5 through 9, the player begins at the symbol 56 labeled with "START" and advances clockwise. It should be appreciated however, that the player can start at any symbol 56 and can advance in any direction. Also, in each of these paths 54, a symbol marker 58 indicates which symbol 56 a player is currently visiting. A symbol marker 58 is any visual manner of distinguishing a symbol 56 being visited by the player from symbols 56 not being visited by the player. Preferably, the symbol marker 58 is a predetermined illumination or coloration. For illustrative purposes only, the symbol marker 58 is shown in FIGS. 5 through 9 as a border.

At least one and preferably each path 54 is associated with one or more path change conditions. In FIG. 5, all of the symbols 56 are of no particular type. If the symbol marker 58 visits one or more predetermined symbols 56 corresponding to a path change condition, a path change condition occurs, and the gaming device causes the symbol marker 58 to move to a different path 54.

Furthermore, one or more paths 54 in a bonus round include bonus values associated with one or more of the symbols 56. Before a path change condition occurs or upon the occurrence of a path change condition, preferably the player has the opportunity to gain bonus values by causing the symbol marker 58 to visit certain symbols 56.

Paths 54 can also include specific types of symbols 56 and specific types of path change conditions, as illustrated in FIGS. 6 through 9. The path 54 shown in FIG. 6 includes various symbols 56 of no particular type and a plurality of accumulation symbols 60. The accumulation symbols 60 are illustrated as stars. If the symbol marker 58 visits a predetermined number of (in this example, three) accumulation symbols 60, a path change condition occurs. Then the symbol marker 58 will move to a different path 54.

Figure 7:
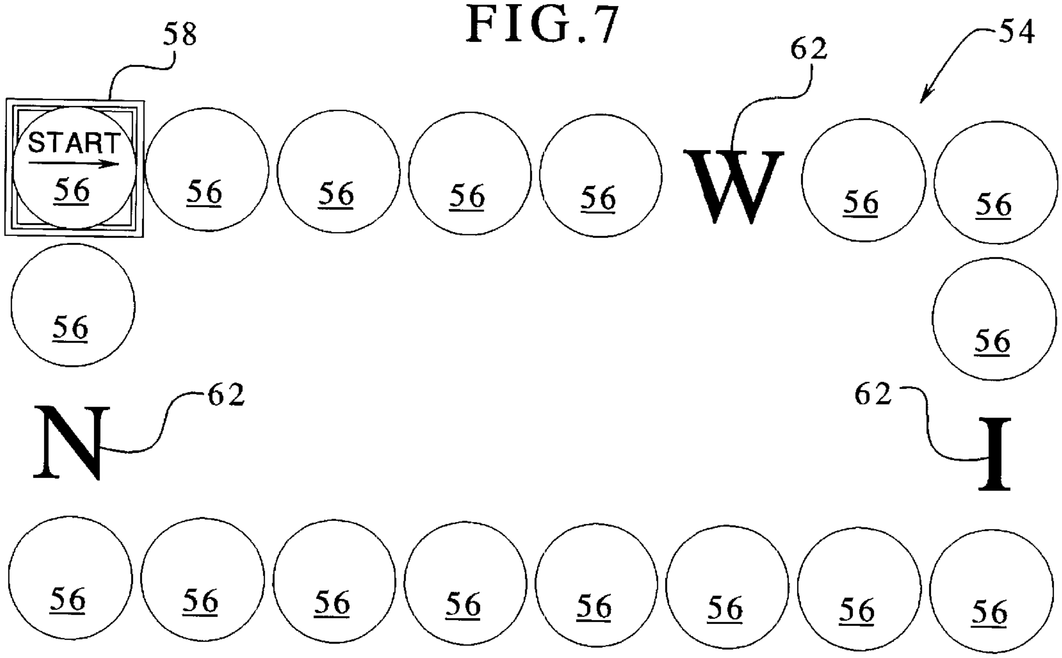
FIG. 7 is a top plan view of a path of the present invention including combination symbols.

In another path 54 shown in FIG. 7, the path 54 includes symbols 56 of no particular type and a plurality of combination symbols 62. Here, a path change condition occurs when the symbol marker 58 visits each of the combination symbols 62 shown in FIG. 7, forming the word, "WIN." This particular combination is used here merely for illustrative purposes, and it should be appreciated that any single symbol or combination of any symbols 62 can result in a path change condition.

Figure 8:
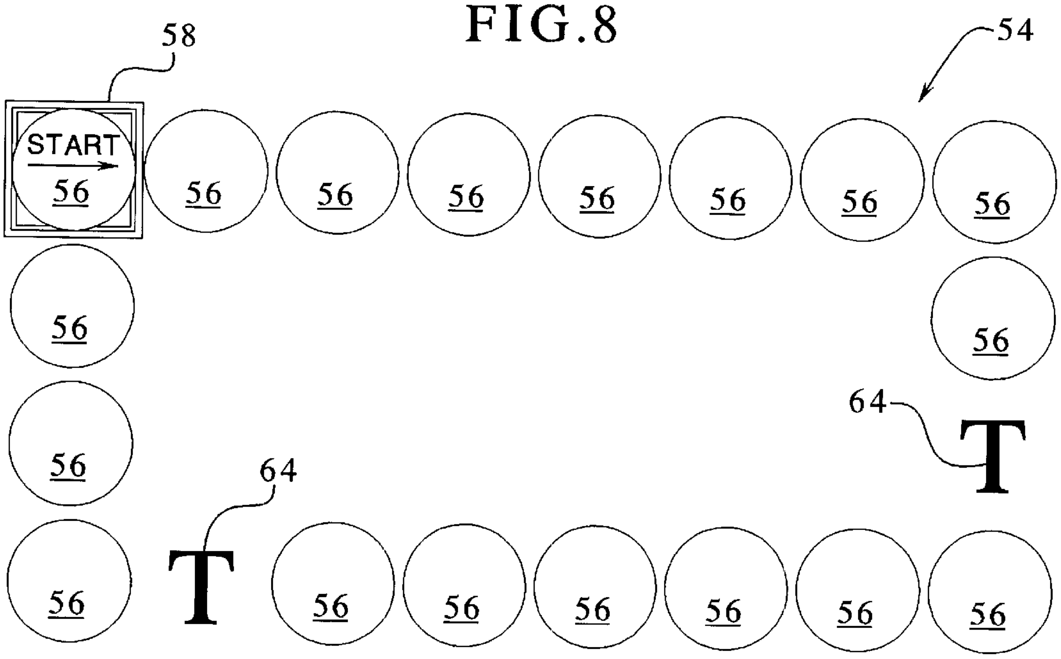
FIG. 8 is a top plan view of a path of the present invention including terminating symbols.

In FIG. 8, the path 54 includes symbols 56 of no particular type and one or more terminating symbols 64. Terminating symbols 64 are represented by the letter "T" in FIG. 8. Here, the path change condition is the player completing a predetermined number of trips through path 54 while avoiding the terminating symbols 64.

Figure 9:
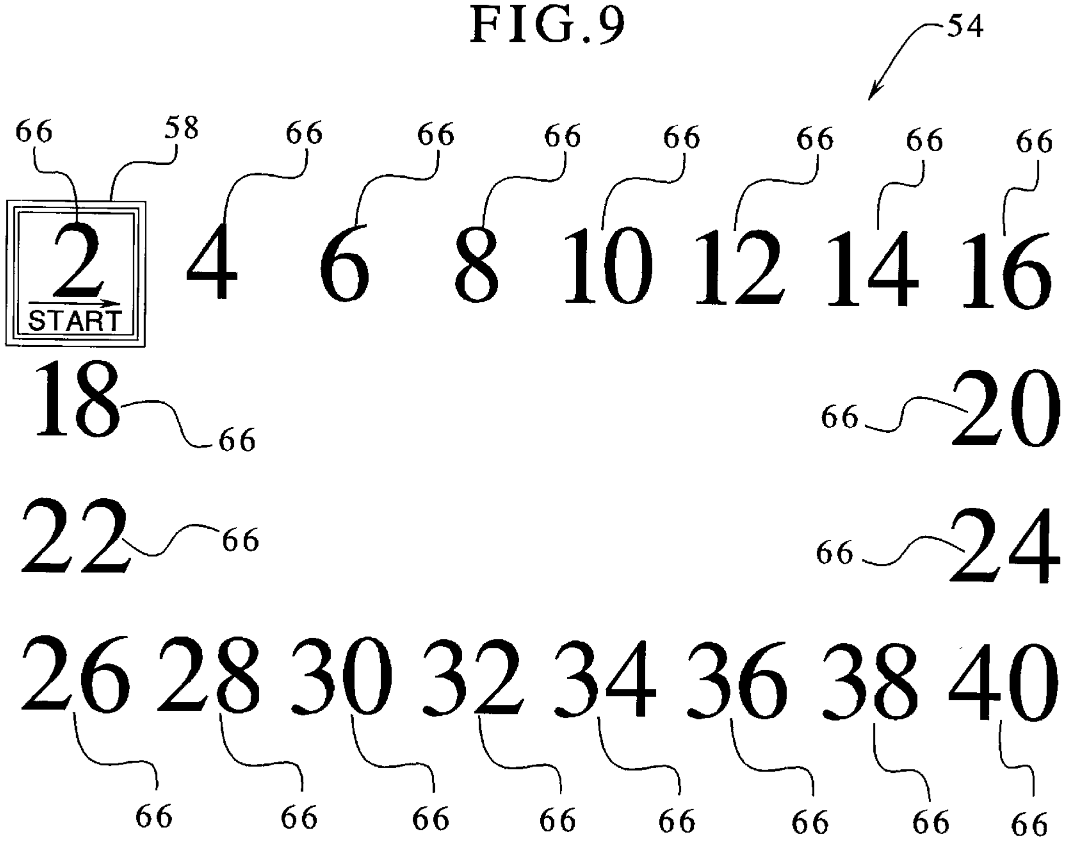
FIG. 9 is a top plan view of a path of the present invention including award symbols in numeric form.

The path 54 shown in FIG. 9 includes a plurality of award symbols 66. An award symbol 66 is any symbol which, when visited by a symbol marker 58, causes the gaming device to award a bonus value to the player. In the path 54 shown in FIG. 9, all of the symbols are award symbols 66, however it should be appreciated that this path 54 can includes other types of symbols. In addition in FIG. 9, all of the award symbols 66 are numeric symbols, but award symbols 66 can be displayed as non-numeric symbols. An example path change condition for this embodiment is a symbol marker 58 visiting certain symbols 66 such that the player gains a predetermined amount in bonus values (i.e., any amount above one hundred).

Referring back to FIG. 3, after the gaming device displays one or more paths 54 and the symbols 56, the gaming device causes the symbol marker 58 to visit a symbol on a path 54, as indicated by block 68. The gaming device can cause this visit automatically. However, the gaming device preferably does so by enabling the player to push a play button 20 or other activator.

Depending upon which symbol 56 the symbol marker 58 visits, an award condition or terminating condition may occur. An award condition occurs when the symbol marker 58 visits an award symbol 66 or visits a predetermined combination of symbols 56 associated with a bonus value. Preferably, the gaming device includes an award limit. If an award condition occurs and causes the player to reach the award limit, the bonus round terminates, as indicated by diamond 70. Likewise, as indicated by diamond 70, if the player reaches a terminating condition, the bonus round terminates. As indicated by block 72, once the bonus round terminates, the gaming device awards the player with any gained bonus values and the corresponding credits and payout.

Figure 3:
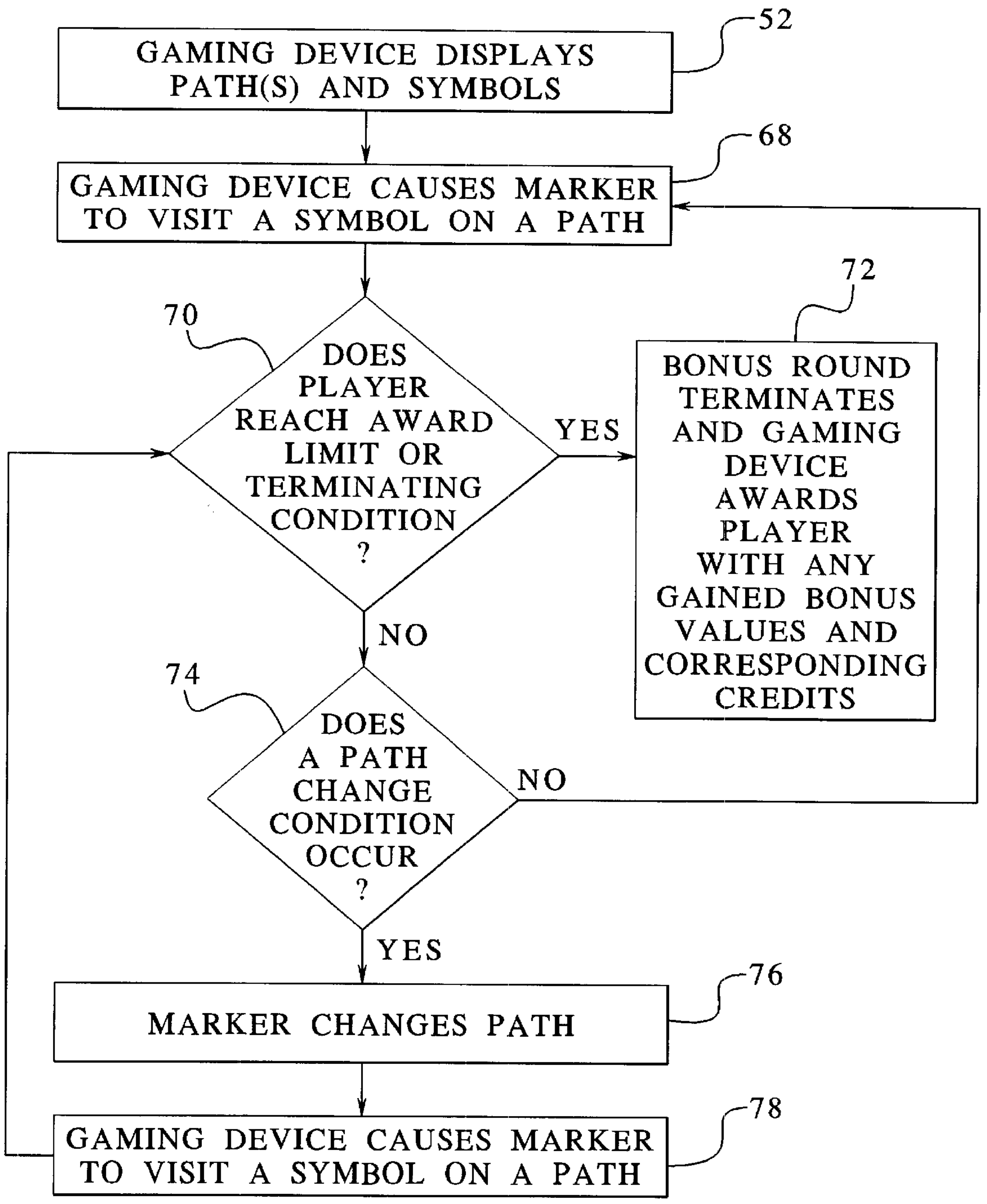
FIG. 3 is a flow diagram of one embodiment of the bonus scheme of the present invention.
Figure 4:
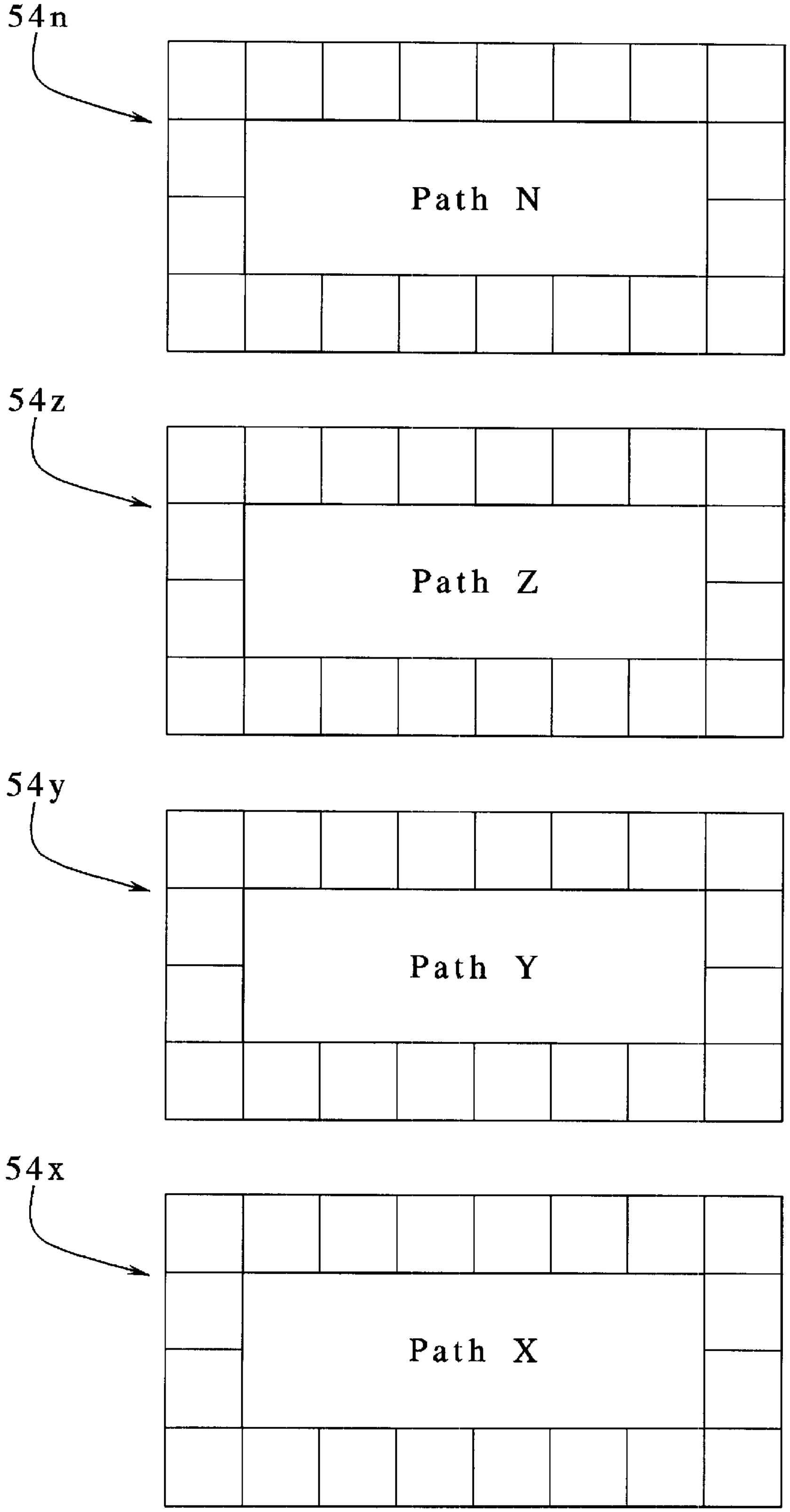
FIG. 4 is a top plan view of multiple paths of the present invention.

As indicated by diamond 74 in FIG. 3, if the player does not reach the award limit or a terminating condition and if a path change condition does not occur, the gaming device causes the marker to visit another symbol on the same path 54. If the player avoids the award limit and any terminating condition, this process continues until a path change condition does occur.

As indicated by diamond 74 and block 76, if a path change condition occurs, the symbol marker 58 changes paths 54. The symbol marker 58 can move to any path 54. For example, with reference to FIG. 4, if the symbol marker 58 began on path 54*x*, the symbol marker 58 could next move to path 54*z* or any other path 54. Preferably, path movement is sequential although it could be non-sequential or random.

As indicated by block 78, after the symbol marker 58 changes paths, the gaming device causes the symbol marker 58 to visit a symbol 56 on the new path 54. As long as the player avoids the award limit and terminating conditions, the player will continue to have the opportunity to reach additional path change conditions. It should be understood that these additional path change conditions can cause the symbol marker 58 to move to paths 54 previously visited. Eventually, the player will reach the award limit or a terminating condition, and the bonus round will terminate.

Figure 10:
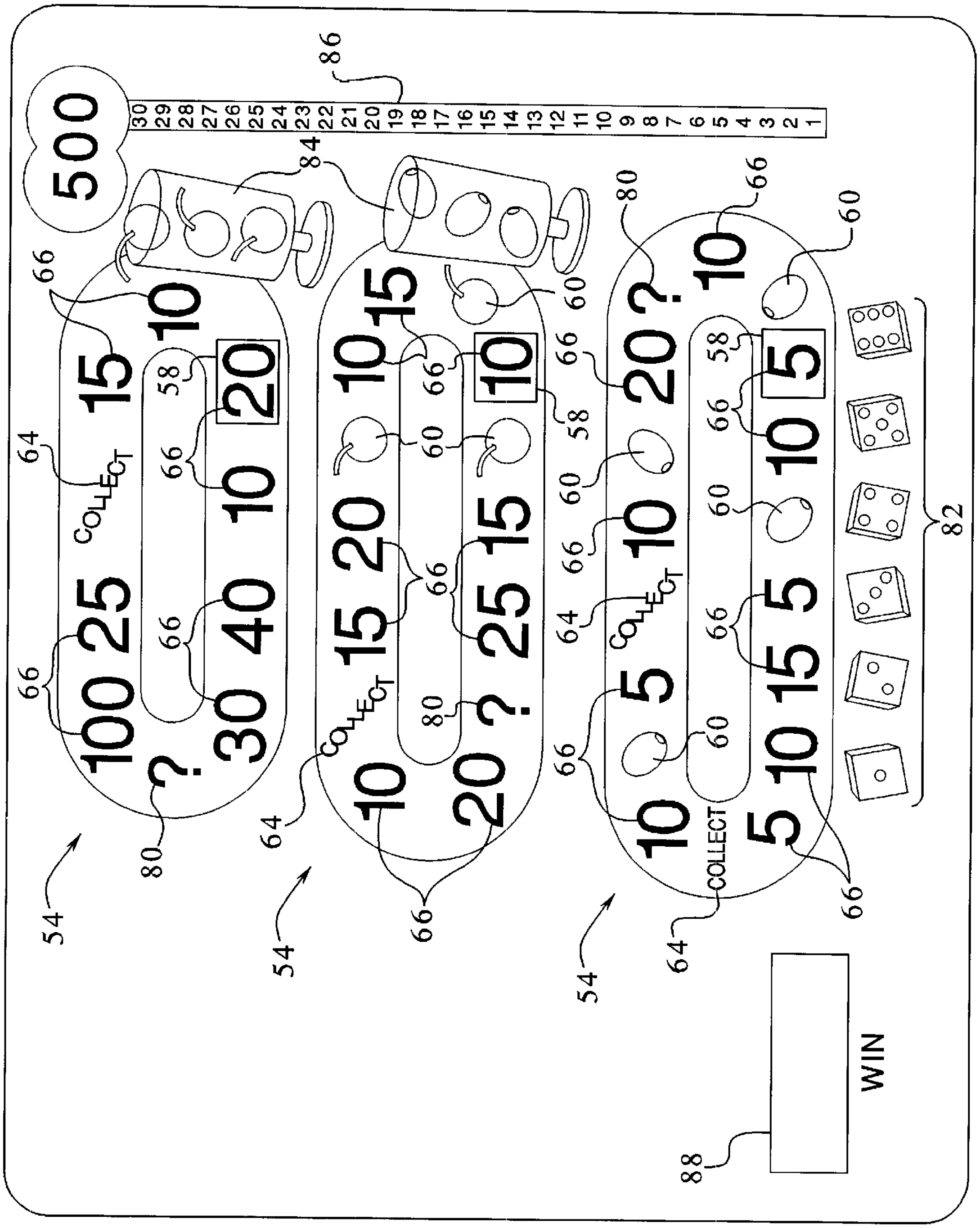
FIG. 10 is a top plan view of three paths in an alternative embodiment of the present invention.

In one preferred embodiment shown in FIG. 10, the gaming device displays lower, middle and upper paths. Each path includes a plurality of award symbols 66 in numeric form, at least one terminating symbol 64 labeled as "COLLECT" and at least one wildcard symbol 80. When a symbol marker 58 visits a wildcard symbol 80, the wildcard symbol 80 will either function as a terminating symbol and terminate the game, or the wildcard symbol 80 will enable the player to continue playing by pushing play button 20 again. Whether the wildcard symbol 80 will terminate or continue the bonus round is determined, preferably randomly, by the gaming device on a fifty-fifty probability basis.

In addition, the lower and middle paths 54 each include three or more accumulation symbols 60. In the lower path 54, the accumulation symbol 60 is an image of an olive. In the middle path 54, the accumulation symbol 60 is an image of a cherry.

Figure 11:
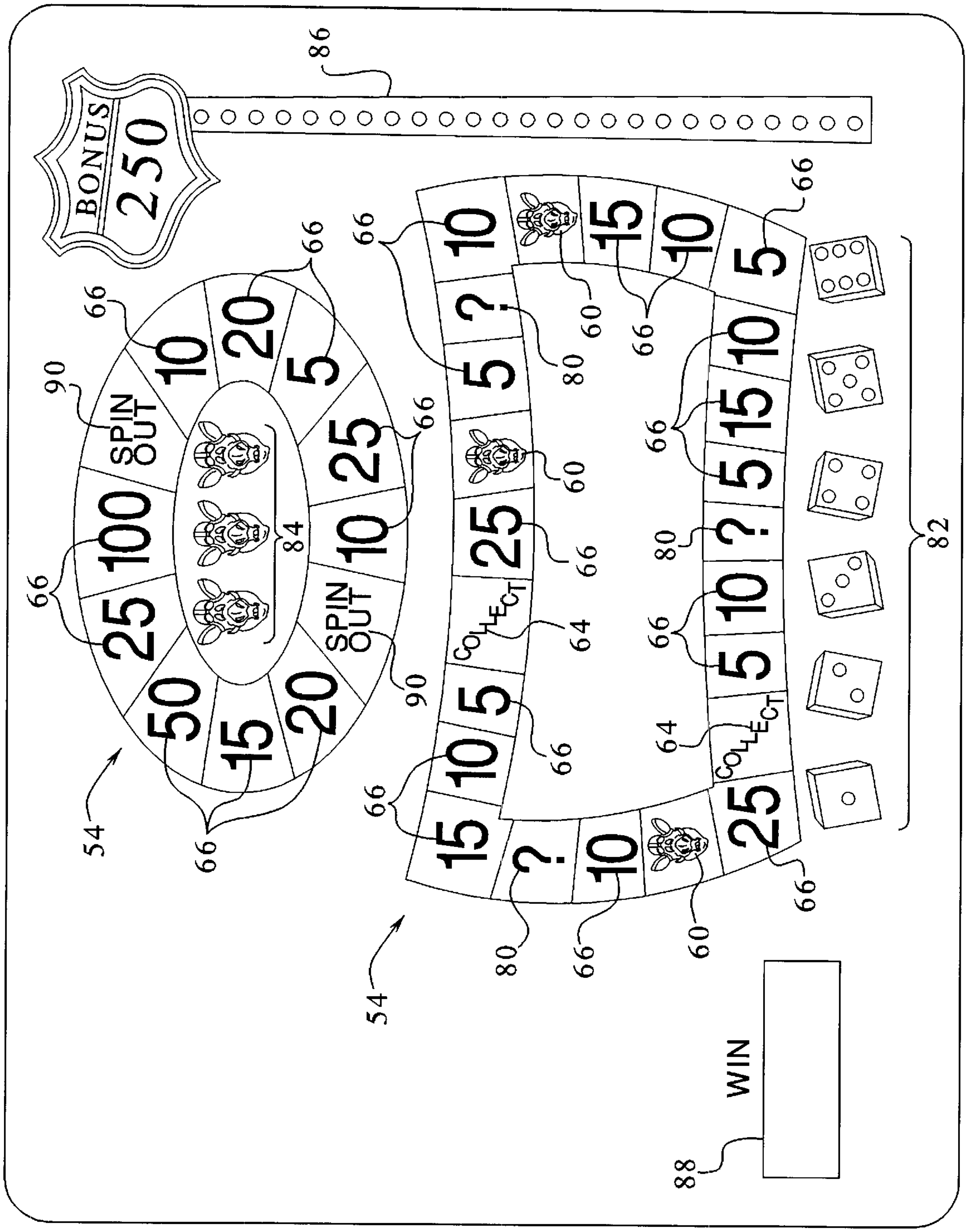
FIG. 11 is a top plan view of two paths in an alternative embodiment of the path of the present invention.

In operation, the bonus round for this embodiment begins at the lower path 54 at a predetermined symbol. The player pushes play button 20, and the gaming device activates the visit indicator 82. As shown in FIGS. 10 and 11, the visit indicator 82 is in the form of six dice, numbered one through six. The gaming device (preferably randomly) identifies one of these dice, and the number displayed by that dice is the number of symbols that the symbol marker 58 will move forward.

In this embodiment, the path change condition is the symbol marker 58 visiting three accumulation symbols 60. Preferably, the path change condition only applies to the lower and middle paths 54. It is also preferable that each time the symbol marker 58 visits an accumulation symbol 60, the gaming device indicates that the player has done so by displaying one accumulation symbol at an accumulation indicator 84. As shown in FIG. 10, preferably the accumulation indicator associated with the lower path 54 is a drinking glass containing olives, and the accumulation indicator 84 associated with the middle path 54 is a drinking glass containing cherries.

After the visit indicator 82 indicates how far the symbol marker 58 will advance along the lower path 54, the symbol marker 58 visits a symbol on the lower path 54. As long as the player avoids terminating symbols 64 and wildcard symbols 80 which function as a terminating symbols, the player can gain bonus values by repeatedly pushing play button 20 and making one-or more trips through the lower path 54.

However, the bonus round terminates if at any time during the bonus round the player reaches a predetermined award limit. Here, the player reaches an award limit if the player pushes play button 20 thirty consecutive times while avoiding a termination condition. If the player reaches this award limit, the bonus round automatically terminates and awards the player with a value, preferably a value of five hundred.

If, however, while avoiding termination and the award limit, the symbol marker 58 visits three olive accumulation symbols 60, a path change condition occurs, and the symbol marker 58 moves to the middle path 54. There, the same process occurs as in the lower path 54. If the player avoids the termination conditions and the award limit and reaches a path change condition, the symbol marker 58 moves to the upper path 54. In upper path 54, there are no accumulation symbols 60, and there is no path change condition. The player remains in this path 54 until reaching a termination condition or the award limit, at which time the bonus round terminates. As described above, if the bonus round terminates in this manner, the gaming device awards the player with the preferred value of five hundred. Preferably, the gaming device indicates the cumulative number of non-terminating visits a marker makes at award limit indicator 86 shown in FIG. 10. FIG. 10 also shows a preferable credit window 88 for displaying the total credits gained by the player at the end of the bonus round. Furthermore, this preferred embodiment preferably incorporates various images and text consistent with an island vacation theme as is apparent by viewing FIG. 10.

In an alternative preferred embodiment shown in FIG. 11, the gaming device displays a lower and upper path 54. The lower path 54 includes a plurality of award symbols 66 in numeric form, at least one terminating symbol 64 labeled as "COLLECT" and at least one wildcard symbol 80. Wildcard symbol 80 has the same function as it does in the embodiment described above. The lower path 54 includes three or more accumulation symbols 60. The accumulation symbol 60 is an image of a pig or hog character.

In operation, the bonus round for this embodiment begins at the lower path 54 at a predetermined symbol. The player pushes play button 20, and the gaming device activates the visit indicator 82. The visit indicator 82 in this embodiment functions the same as the visit indicator 82 in the embodiment discussed above. The path change condition for the lower path 54 is satisfied when the symbol marker 58 visits three accumulation symbols 60. It is also preferable that each time the symbol marker 58 visits an accumulation symbol 60, the gaming device indicates that the player has done so by illuminating one accumulation symbol at an accumulation Indicator. As shown in FIG. 11, the accumulation indicator associated with the lower path 54 is a set of three pig characters located in the center of the upper path 54. When a symbol marker 58 visits an accumulation symbol 60 in the lower path 54, the gaming device illuminates one of these three pig characters.

After the visit indicator 82 indicates how far the symbol marker 58 will advance along the lower path 54, the symbol marker 58 visits the appropriate symbol on the lower path 54. As long as the player avoids terminating symbols 64 and wildcard symbols 80 which function as a terminating symbols, the player can gain bonus values by repeatedly pushing play button 20 and making one or more trips through the lower path 54.

However, the bonus round terminates if at any time during the bonus round the player reaches a predetermined award limit. Here, the player reaches an award limit if the player pushes play button 20 twenty-five consecutive times while avoiding the termination conditions. If the player reaches this award limit, the bonus round automatically terminates and awards the player with a value, preferably a value of two hundred fifty.

If, however, while avoiding termination and the award limit, the symbol marker 58 visits three pig character accumulation symbols 60, a path change condition occurs, and the symbol marker 58 moves to the upper path 54 at a predetermined symbol.

Upper path 54 includes award symbols 66 in numeric form and one or more out symbols 90. If a symbol marker 58 visits an out symbol 90, the gaming device moves the symbol marker 58 out of the upper path 54 to the lower path 54. The gaming device also removes the illumination from one of the pig characters in the accumulation indicator.

With the symbol marker 58 back in the lower path 54, the gaming device enables the player to push play button 20 repeatedly until reaching termination, the award limit or another path change condition. However, at this point the path change condition is two thirds fulfilled. The player only needs to reach one pig character accumulation symbol 60 in order to fulfill the path change condition. At this point, the symbol marker 58 can move back and forth between the lower path 54 and upper path 54 until the player reaches termination or the award limit, at which time the bonus round terminates.

Preferably, the gaming device displays the cumulative number of non-terminating visits a marker makes at award limit indicator 86 shown in FIG. 11. FIG. 11 also shows a preferable credit window 88 for displaying the total credits gained by the player at the end of the bonus round. Furthermore, this preferred embodiment preferably incorporates various images and text consistent with a motorcycle riding or biking theme as is apparent by viewing FIG. 11.

In another embodiment, the symbol marker advances along a cyclical path which includes one or more terminating symbols. If the symbol marker visits a terminating symbol, the bonus round terminates. When a path change condition occurs, the symbol marker moves to a different path. The player can then advance the marker symbol along this different path. Preferably, the path change condition is the symbol marker completing a predetermined number of trips through a path without landing on a terminating symbol. This embodiment can include any number of paths. The player also has an opportunity to gain bonus values at each path, and preferably the bonus values available to the player increase with each path change.

The bonus scheme of the present invention involves a symbol marker which advances along one path consisting of a plurality of predetermined symbols. Depending upon which symbols the symbol marker visits, one or more path change conditions may occur, causing the symbol marker to change paths. In addition, depending upon which symbols the symbol marker visits, the player can gain bonus values, preferably up to a predetermined award limit.

In an alternative embodiment of the present invention, one or more of the paths and preferably the final path includes at least one and preferably a plurality of jackpot or other award accumulation symbols, wherein the player wins a jackpot or other award if the symbol marker visits all of said accumulation symbols. Preferably, when the player obtains such award, the bonus round terminates. This type of bonus scheme increases the entertainment and excitement experienced by gaming device players.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is hereby claimed as follows:

1. A gaming device having a bonus scheme comprising;

a plurality of paths, each including a plurality of symbols;

a play activator;

at least one bonus value associated with at least one of said symbols;

a symbol marker indicating which symbol a player is currently visiting;

a display device adapted to display the paths, the symbols, the symbol marker and an accumulation indicator to the player;

at least one path change condition which occurs when the symbol marker visits one or more accumulation symbols In a currently visited path more than once;

said accumulation indicator indicating the number of times one or more of the accumulation symbols have been visited in said currently visited path; and whereby when the path change condition occurs, the symbol marker visits a symbol located in a path which is different from the path the symbol marker is currently visiting.

2. The gaming device of claim 1, wherein the path change condition occurs when a predetermined symbol in one of said paths is visited more than once.

3. The gaming device of claim 1, which includes at least one cyclical path.

4. The gaming device of claim 3, wherein the path change condition is a predetermined number of trips through the cyclical path.

5. The gaming device of claim 1, wherein the plurality of paths are displayed successively in place of one another.

6. The gaming device of claim 1, wherein the plurality of paths are simultaneously displayed.

7. The gaming device of claim 1, which includes an award condition.

8. The gaming device of claim 7, which includes at least one award symbol.

9. The gaming device of claim 8, which includes a plurality of award symbols which correspond to the bonus value.

10. The gaming device of claim 9, which includes at least one terminating symbol.

11. The gaming device of claim 10, which includes at least one award limit.

12. The gaming device of claim 11, which includes at least one award limit indicator.

13. The gaming device of claim 9, which includes at least one visit indicator.

14. The gaming device of claim 1, which includes at least one wildcard symbol.

15. A method for operating a bonus round of a gaming device, said method comprising the steps of:

(a) triggering the bonus round;

(b) displaying at least a first path including a plurality of symbols;

(c) causing a symbol marker to visit at least one symbol on the first path;

(d) displaying an accumulation indicator which indicates a number of accumulation symbols of said first path which have been visited by the symbol marker; and (e) causing the symbol marker to move to a second path when the symbol marker visits one accumulation symbol more than once or more than one accumulation symbols in said first path.

16. The method of claim 15, wherein the symbol marker visiting a predetermined type of symbol at least two times causes the symbol marker to move to the second path.

17. The method of claim 16, wherein the symbol marker visiting a plurality of symbols associated with a predetermined cumulative bonus value causes the symbol marker to move to the second path.

18. The method of claim 16, which includes the step of providing a bonus value when the symbol marker visits a predetermined symbol.

19. The method of claim 16, which includes the step of terminating the bonus round when the symbol marker makes a predetermined number of visits.

20. The method of claim 16, which includes the step of terminating the bonus round when the symbol marker visits a terminating symbol.

21. The method of claim 16, which includes the step of terminating the bonus round when a terminating condition occurs.

22. The method of claim 15, wherein the symbol marker visiting a predetermined combination of symbols causes the symbol marker to move to the second path.

23. A method for operating a bonus round of a gaming device, said method comprising the steps of:

(a) triggering the bonus round;

(b) displaying a plurality of paths, including at least a first path and a second path;

(c) displaying a plurality of symbols on said plurality of paths;

(d) providing at least one path change condition associated with the first path;

(e) moving a marker symbol from the first path to the second path after a path change condition occurs on the first path, wherein said path change condition occurs when said marker symbol visits an accumulation symbol more than once or at least two accumulation symbols in the first path; and (f) displaying an accumulation indicator which indicates a number of accumulation symbols of said first path visited by the marker symbol after each visit to said accumulation symbol or to one of the accumulation symbols.

24. The method of claim 23, which includes providing a plurality of award accumulation symbols in the second path.

25. The method of claim 24, which includes awarding a jackpot award to a player when the player obtains the award accumulation symbols.

26. The method of claim 23, which includes the step of providing at least one out symbol in the second path.

27. The method of claim 26, which includes the step of moving the marker symbol from the second path to the first path after the marker symbol visits an out symbol.

28. The method of claim 27, which includes the step of moving the marker symbol from the first path to the second path after another path change condition occurs in the first path.

* * * * *

UNITED STATES PATENT AND TRADEMARK OFFICE

CERTIFICATE OF CORRECTION

PATENT NO. : 6,602,136 B1
DATED : August 5, 2003
INVENTOR(S) : Baerlocher et al.

It is certified that error appears in the above-identified patent and that said Letters Patent is hereby corrected as shown below:

Title page,
Item [*] Notice, should read:
-- [*] Notice: Subject to any disclaimer, the term of this patent is extended or adjusted under 35 USC 154(b) by 364 days. --

Signed and Sealed this

Twenty-seventh Day of January, 2004

JON W. DUDAS
*Acting Director of the United States Patent and Trademark Office*